United States Patent
Hill et al.

(10) Patent No.: US 6,822,766 B2
(45) Date of Patent: Nov. 23, 2004

(54) CORRECTION FOR DEBRIS AND LOW OUTPUT PHOTOSENSORS IN SCROLL FED SCANNER USING STORED INITIAL CALIBRATION DATA

(75) Inventors: Edward A. Hill, Carditt, CA (US); Craig T. Johnson, San Diego, CA (US); Carolyn L. Harris, Escondido, CA (US); William D. Amidei, Carlsbad, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 656 days.

(21) Appl. No.: 09/797,268

(22) Filed: Mar. 1, 2001

(65) Prior Publication Data

US 2002/0122213 A1 Sep. 5, 2002

(51) Int. Cl.[7] ................ H04N 1/00; H04N 1/40; H04N 1/46; H01L 27/00
(52) U.S. Cl. ................ 358/474; 358/504; 358/406; 358/447; 358/443; 250/208.1
(58) Field of Search ................ 358/504, 406, 358/474, 465, 443, 447, 516; 382/274, 275; 250/208.1

(56) References Cited

U.S. PATENT DOCUMENTS

| 5,552,597 | A | | 9/1996 | McConica | 250/234 |
|---|---|---|---|---|---|
| 5,783,820 | A | * | 7/1998 | Takami | 250/239 |
| 5,798,847 | A | * | 8/1998 | Aerts | 358/464 |
| 5,864,408 | A | * | 1/1999 | Kumashiro | 358/461 |
| 5,930,433 | A | | 7/1999 | Williamson et al. | 385/116 |
| 5,969,371 | A | | 10/1999 | Anderson et al. | 250/559 |
| 6,002,124 | A | | 12/1999 | Bohn et al. | 250/208.1 |
| 6,033,086 | A | | 3/2000 | Bohn | 362/235 |
| 6,040,572 | A | | 3/2000 | Khovaylo et al. | 250/235 |
| 6,108,461 | A | | 8/2000 | Haga | 382/312 |
| 6,111,244 | A | | 8/2000 | Wang | 250/208.1 |
| 6,154,294 | A | | 11/2000 | Craig et al. | 358/483 |
| 6,160,250 | A | | 12/2000 | Miksch et al. | 250/208.1 |
| 6,172,360 | B1 | | 1/2001 | Khovaylo et al. | 250/235 |
| 6,184,515 | B1 | | 2/2001 | Bohn | 250/208.1 |
| 6,292,269 | B1 | * | 9/2001 | Kawai | 358/1.9 |
| 6,317,223 | B1 | * | 11/2001 | Rudak et al. | 382/275 |

\* cited by examiner

*Primary Examiner*—Edward Coles
*Assistant Examiner*—Jason Sherrill

(57) ABSTRACT

A circuit connected to a linear array of photosensors generates image data representative of information printed on a document and adjusts the gains applied to the outputs of selected ones of the photosensors to eliminate streaks in the image data otherwise due to the selected photosensors imaging debris on an optical reference surface. The circuit determines which photosensors have low output values during a factory scan of a clean white reference surface. During a subsequent user environment calibration scan, low output values are adjusted to the average of their neighbors, but only for locations not identified as having low outputs during the factory scan. The circuit additionally performs a PRNU compensation and further adjusts the gains applied to each of the outputs of the photosensors so that all of their output values have a substantially uniform value.

18 Claims, 3 Drawing Sheets

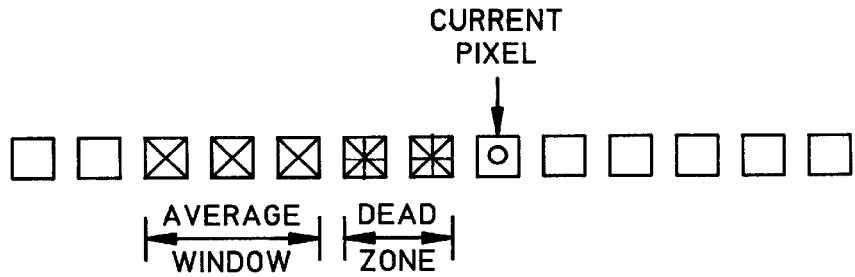
FIG. 2
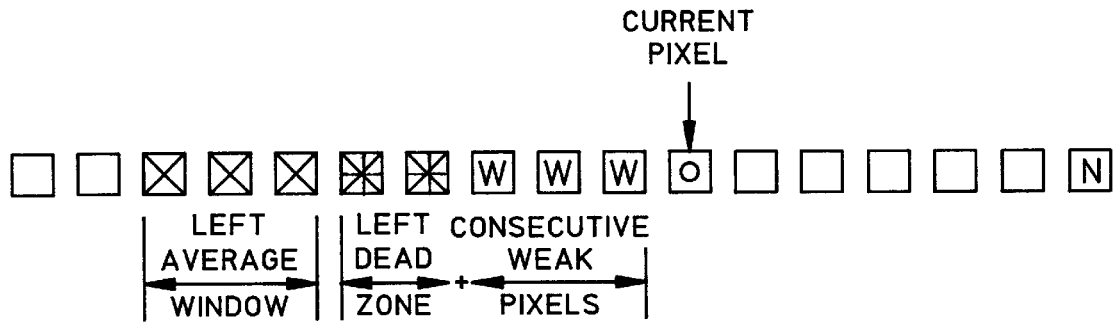
FIG. 3
FIG. 4
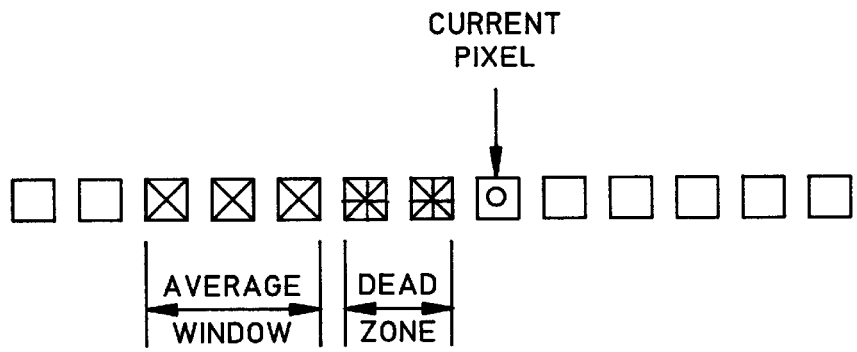
FIG. 5

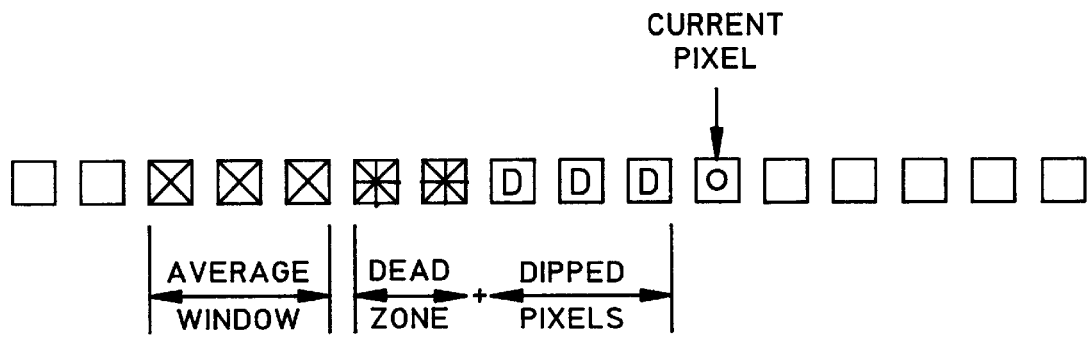

CORRECTION FOR DEBRIS AND LOW OUTPUT PHOTOSENSORS IN SCROLL FED SCANNER USING STORED INITIAL CALIBRATION DATA

CROSS-REFERENCE TO RELATED APPLICATIONS

The subject application is related to co-pending U.S. patent application Ser. No. 09/414,391 of Jia et al. filed Oct. 7, 1999 entitled *Method for Automatic Removal of Vertical Streaks by Modifying Image Data Associated with Non-homogeneous Image Elements* and co-pending U.S. patent application Ser. No. 09/414,023 of Nobel et al. filed Oct. 7,1999 entitled *Method For Automatic Prevention of Vertical Streaks by Selectively Applying Gains to The Output Signals of Optical Sensor Elements*, both assigned to the Hewlett-Packard Company, the assignee of the subject application. The entire disclosures of the aforementioned two co-pending applications are specifically incorporated herein by reference.

FIELD OF THE INVENTION

The present invention relates to optical scanners, and more particularly, to optical scanners having a plurality of photosensors mounted in a linear array past which a document is fed.

BACKGROUND OF THE INVENTION

Optical scanners for reading text and graphics off of documents are in widespread use in facsimile machines, digital copiers, and in portable and flatbed scanners used with personal computers. The image data produced by these devices is used to transmit information in the case of a facsimile machine, make additional copies in the case of a digital copier, and to store, display and manipulate the same in the case of a personal computer.

A typical optical scanner includes an optical imaging assembly comprising illumination, optical and detection systems. The illumination system includes a light source that illuminates a portion of the object which is commonly referred to as a scan region. The optical system collects the light reflected by the illuminated scan region and focuses a small area of the illuminated scan region, commonly referred to as the scan line, onto the surface of the detection system that typically comprises, for example, a photosensor module positioned within the scanner. The photosensor module converts the image light incident thereon into electrical signals representative of the scan line. Image data representative of the entire document may be obtained by sweeping the scan line across the entire document.

Facsimile machines and other low cost "scroll fed" optical scanners typically use a contact image sensor (CIS) which is a type of photosensor module that is smaller than optical reduction systems. The photosensors in a conventional CIS are either charge coupled devices (CCDs) or CMOS devices. They are arranged in a linear array and are spaced at the pitch of the scanner's resolution, e.g. three hundred photosensors per inch for a three hundred dots per inch (DPI) scanner. Each of these photosensors must be calibrated before a high-quality scan operation can be performed. Photosensors are calibrated by imaging a target with known color properties, which is typically a white reference surface, and applying a gain to the output of each photosensor such that the signal returned matches the expected signal for the white reference surface.

Scroll fed scanners that employ a CIS module inherently build up debris on the white reference surface as the module contacts the paper fibers, roller debris, and other artifacts that may be fed into the scanner along with the original documents. This debris often creates annoying vertical streaks along the entire vertical dimension of the copy or scan output. It is possible to detect low photosensor values in the white reference scan data. However, these low values may be due to debris on the white reference surface, weak photosensors, debris within the CIS module, or combinations of the same.

In prior art scroll fed scanners, when the white reference surface contains debris and a calibration is performed, gains will be set erroneously. For example, assume that the average white reference photosensor value returned before gains are applied to each photosensor is one hundred. During calibration, a photosensor imaging debris on the white reference surface may have a value of fifty. The gain for this photosensor will then be set twice as high as that of the other photosensors. When a document scan is subsequently performed, the higher signal from the photosensor that was calibrated while imaging debris will result in a bright vertical streak in the copy or scan output. Clearly, in this situation an additional gain should not have been applied to the photosensor which returned a low white reference scan value due to the existence of debris on the white reference surface.

Alternatively, the CIS module may contain a weak photosensor or may have debris internal thereto. Assume once again that the average white reference photosensor value returned before gains are applied to each photosensor is one hundred. For a weak photosensor, or a photosensor being blocked by debris within the CIS module, the value may be fifty, for example. In either of these cases, the gain for this photosensor will be set twice as high as that for the other photosensors. When a document scan is subsequently performed, the gain for the weak or obstructed photosensor will be corrected so that the quality of the copy or scan output will be acceptable, i.e. there will be no streaks.

Flatbed scanners can average out a weak response from a photosensor due to debris by moving the scanner head or bar during the white reference calibration scan. However, heretofore prior art scroll fed scanners have not adequately taken into account all of the variables when calibrating the photosensors against the white reference surface, resulting in undesirable streaking in the copy or scan output. Accordingly it would be desirable to provide an improved scroll fed scanner that would taken into account debris and other artifacts, as well as low output photosensors, to ensure optimum copy or scan output.

SUMMARY OF THE INVENTION

Therefore, it is the primary object of the present invention to provide an improved scroll fed scanner that takes into account the existence of debris and other artifacts, as well as low output photosensors, in order to ensure optimum copy or scan output.

It is another object of the present invention to provide an improved method of adjusting photosensor output in a scroll fed optical scanner to eliminate streaks in the scan output.

In accordance with the present invention an optical scanner includes a scroll fed transport for propelling a document to be scanned along a paper path including an optical reference surface. A light source illuminates the optical reference surface, or if a document is being propelled along the paper path over the optical reference surface, a scan region on the document. A plurality of photosensors receive light reflected from the optical reference surface or the scan region on the document. A circuit connected to the photosensors generates image data representative of information printed or otherwise formed on the document and adjusts the gains applied to the outputs of selected ones of the photosensors to eliminate streaks in the image data otherwise due to the selected photosensors imaging debris on the optical reference surface.

The present invention also provides a method of ensuring optimum scan output quality of a scanner. An initial factory calibration scan of a reference surface is performed with a plurality of photosensors when the white reference surface is known to be clean The locations of all photosensors having output values below a first predetermined threshold value are stored in a memory. Thereafter, a subsequent user environment calibration scan of the reference surface is performed. The gain applied to each photosensor output is adjusted if its output value falls below a second predetermined threshold value, but only if its location was not one of the locations stored during the initial calibration scan. The amount of gain adjustment is sufficient such that the scan output is devoid of visible streaks otherwise due to the photosensors imaging debris or other artifacts present on the reference surface during the subsequent user environment calibration scan.

BRIEF DESCRIPTION OF THE DRAWINGS

FIGS. 2–8 are diagrammatic illustrations of the handling of photosensor values in accordance with a firmware implemented dust calibration algorithm executed by the scroll fed optical scanner of FIG. 1.

DESCRIPTION OF THE PREFERRED EMBODIMENTS

Figure 1:
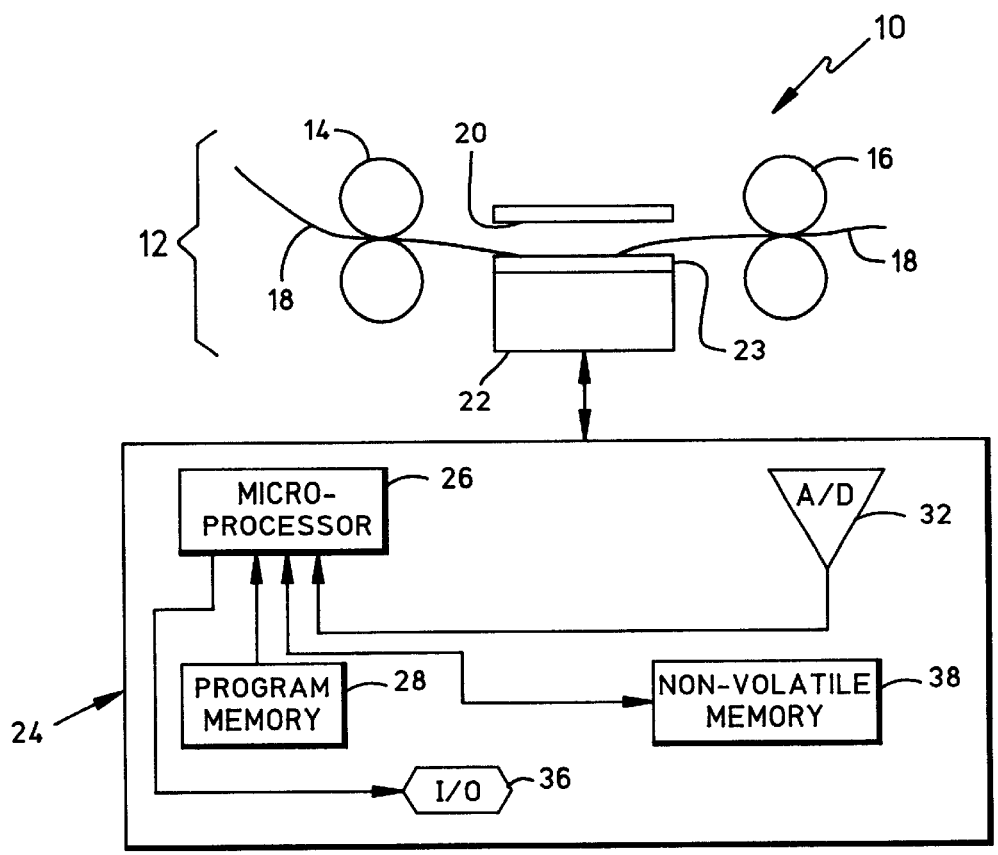
FIG. 1 is a greatly simplified diagrammatic view of a scroll fed optical scanner in accordance with the present invention.

Referring to FIG. 1, an optical scanner 10 includes a scroll fed transport 12 with motorized pinch rollers pairs 14 and 16 that propel an original document 18. The document 18 has information pre-printed or otherwise formed thereon which is to be optically scanned. The transport 12 defines a paper path that extends longitudinally between the pinch roller pairs 14 and 16 and includes a white colored optical reference surface 20. A contact image sensor (CIS) module 22 is mounted adjacent the paper path opposite the optical reference surface 20. The CIS module 22 includes a linear array of photosensors sufficient in spacing and number to achieve a minimum resolution of three hundred dots per inch (DPI), for example. The CIS module 22 contains red, green and blue LEDs that provide a light source that illuminates, via an internal light pipe, the optical reference surface 20 when the document 18 is not covering the optical reference surface. The CIS module 22 has a conventional design. See for example U.S. Pat. No. 6,108,461 of Haga granted Aug. 22, 2000 assigned to NEC Corporation, the entire disclosure of which is hereby incorporated by reference.

Another exemplary array of photosensors for use in the optical scanner 10 comprises a 2,700-bit x 3 CCD color linear image sensor such as the $\mu$PD3720 integrated circuit manufactured by NEC Corporation. That device has a color filter that provides primary colors (red, green and blue) via rows of photo-sites. Alternatively the optical scanner 10 could employ an optical reduction system including lenses and mirrors that focus light reflected from the document onto a CCD integrated circuit array.

When the document 18 is being propelled longitudinally along the paper path over the optical reference surface 20, a scan region on the document 18 is illuminated. A plurality of photosensors within the CIS module 22 receive light reflected from a scan region on either the optical reference surface 20 or the document 18. The CIS module 22 incorporates a row of barrel shaped lens elements for collecting light from a scan line portion of the scan region and focusing the same on the photosensors. The CIS module 22 also has a glass plate 23 that contacts the document 18 and partially defines the paper path.

The outputs of the photosensors in the CIS module 22 are connected to a processing circuit 24 that generates image data representative of the information pre-printed or otherwise formed on the document 18. This image data can be transmitted over a hardwired public switching network or wireless network where the scanner is part of a facsimile machine. The image data can also be sent to a personal or other computer for storage, printing and/or further manipulation, or transmission over the Internet. The foregoing arrangement is conventional and need not be described in further detail. Scroll fed transports of this general type are well known and have been widely commercialized as combination printer, scanner and facsimile ("all-in-one") machines under the OfficeJet® trademark by the Hewlett-Packard Company. See for example U.S. Pat. No. 5,833,381 of Kellogetal. and U.S. Pat. No. 5,969,371 of Anderson et al., both assigned to the Hewlett-Packard Company, the entire disclosures of which are hereby incorporated by reference.

In accordance with the present invention, the processing circuit 24 adjusts the gains applied to the outputs of selected ones of the photosensors in the CIS module 22 in order to eliminate streaks in the image data otherwise due to these photosensors imaging debris or other artifacts on the optical reference surface 20 after it has become contaminated (dirty) during normal usage. Streaks in the image data manifest themselves as visible vertical streaks in the displayed or printed image of the information scanned. These streaks are usually white or light in color.

The processing circuit 24 includes a microprocessor 26 that executes a firmware program stored in a program memory 28. This program includes a "dust calibration" algorithm hereafter described. The processing circuit 24 further includes conventional analog-to-digital (A/D) circuitry 32 for interfacing with the CIS module 22. Digital-to-analog (D/A) circuitry (not illustrated) connected to another control circuit (not illustrated) drives the CIS module 22. The A/D interface circuitry 32 includes gain adjustable analog amplifiers for increasing or decreasing the outputs of the individual photosensors in the CIS module 22. The processing circuit 24 further includes input-output (I/O) circuitry 36 for transferring image data to a modem, serial data port or other peripheral devices. Calibration data hereafter described is stored in a non-volatile memory (NVM) 38 for access by the microprocessor 26.

The microprocessor 26 of the processing circuit 24 adjusts the gains applied to the outputs of selected ones of the photosensors in the CIS module 22 in order to eliminate streaks in the image data otherwise due to the selected photosensors imaging debris on the optical reference surface 20. An initial factory calibration is performed against the optical reference surface 20 when it is known that the surface 20 is clean and free of debris. A plurality of first locations of predetermined photosensors in the CIS module 22 having output values below a first predetermined threshold value are stored in the NVM 38. When the scanner 10 is thereafter operated in a user environment a subsequent calibration is periodically performed against the reference surface 20 between scanning operations. In accordance with the dust calibration algorithm stored in the program memory 28, the microprocessor 26 only adjusts the gains applied to the outputs of a plurality of photosensors in second locations that have output values below a second predetermined threshold value due to imaging debris on the optical reference surface 20. The second locations are different than the first locations stored in the NVM 38. Therefore, any photosensor in the CIS module 22 which had a low output during the factory calibration does not have any additional gain applied to its output at this stage. A photo responsive non-uniformity (PRNU) compensation is performed after the dust calibration algorithm is executed. The gains applied to all of the photosensor outputs are adjusted so that they have a uniform value. This enables streak-free image data to be generated so that when copies are made, transmitted or displayed no vertical streaks will be visible, even upon careful inspection.

Preferably the second threshold value is about thirty percent higher than the first threshold value. This eliminates false detections during the user environment calibration due to noise. Preferably the microprocessor 28 also determines, as part of the dust calibration algorithm, whether the number of photosensors with output values below the second predetermined threshold value exceeds a predetermined maximum allowed number. If so, the replacing of low values with average values, as hereafter described, is not performed.

A key feature of our invention is that only low photosensor value locations from a clean reference surface scan are stored in the NVM 38. Photosensor values for all locations during a clean (factory) calibration scan are not stored, which results in savings in both memory space and processing time. Low photosensor values are then only adjusted for the remaining locations not stored in the NVM 38 and are presumed to be the result of debris or other imperfections that have affected the reference surface 20, e.g. dust particles, roller particles, skin, hair, paint, white-out, scratches on the reference surface 20, etc. Our invention does not adjust the gains of outputs of photosensors attributable to dirt or other debris present inside the CIS module 22 from inception, or attributable to weakness in the output characteristics of the individual photosensors themselves or other inherent defects in the CIS module 22.

The firmware implemented dust calibration algorithm is stored in the program memory 28 and executed by the microprocessor 26 in order to optimally produce streak-free image data with the optical scanner 10. In accordance with our dust calibration algorithm the microprocessor 26 adjusts the gain for any photosensor output values that are below the second predetermined threshold to bring a resulting raised output value to a level that is an average of the output values of a plurality of surrounding photosensors. In the following discussion, the term "pixel" refers to the portions of an image generated from the output of a single photosensor. However, it should be understood that the present invention is not limited to an optical scanner in which there is a one-to-one relationship between the pixels (or other image elements) and the photosensors of the CIS module 22 or other light sensor device. Without our dust calibration algorithm the optical scanner 10 would only perform a PRNU compensation and would measure dust imaged on the optical reference surface 20 as a dark, low signal strength pixel. The PRNU gain for this pixel would be set particularly high in order to allow this low signal pixel to meet a predetermined white target value. This anomalously high PRNU gain would be applied for this pixel along the entire page or document, resulting in a white streak in the image data. In essence, without the present invention, the low signal pixel is calibrated against a darker target (dust spec) than the rest of the pixel array.

Our dust calibration algorithm is designed to detect debris such as dust specs, and other imperfections on the white optical reference surface or strip 20 that build up or occur in the user environment. It works by searching for low signal pixels (dips) during the factory calibration. The assumption is made that the dips are caused by either debris on the white optical reference surface 20 or by a weak photosensor, or debris or other imperfections within the CIS module 22 itself. The NVM 38 contains a list of weak photosensors so that any dipped pixel that is not on the NVM list has its output replaced by the average of its neighbors. This is based on the assumption that photosensor response varies slowly across the linear array inside the CIS module 22. Our dust algorithm was developed for scroll fed optical scanners, not for flatbed optical scanners. The later type of scanner can average out a weak responding photosensor element by moving the sensor array during white reference surface calibration scanning.

FIGS. 2–8 are diagrammatic illustrations of the handling of photosensor values in accordance with the firmware implemented dust calibration algorithm stored in the program memory 28 and executed by the microprocessor 26. Each pixel has an average value and a dead zone as illustrated in FIG. 2. FIGS. 2–5 illustrate the manner in which the dust calibration algorithm finds weak pixels during the clean reference surface scan or factory calibration procedure. The number of pixels in the average window and dead zone are known constants called NAVG and NDEADZONE, respectively. In FIG. 2, NAVG=3 and NDEADZONE=2. The term CLEAN_THRESH, which is the percentage change allowed between the window average and the current pixel's value, is also a known constant. A pixel is considered weak if the sum of the average window values multiplied by CLEAN_THRESH is greater than the current pixel value times NAVG. A weak pixel is determined in accordance with the comparison relationship illustrated in FIG. 3.

In order to examine the next pixel, the window and dead zone are advanced by one pixel, unless the current pixel is weak. If the current pixel is found to be weak, the associated average window remains stationary and the dead zone expands to include weak pixels until the end of a consecutive string of weak pixels is found, as illustrated in FIG. 4. Once the end of the consecutive string of weak pixels is found, the next pixel examined will be the current pixel of interest plus NAVG+NDEADZONE+1. In FIG. 4, if the current pixel is not weak, the next pixel examined will be the clear pixel marked N at the right hand of FIG. 4. During the factory calibration procedure, if there are too many consecutive weak pixels (>MAXDIP_WIDTH) or if there are too many weak pixels overall (>NUM_WEAK_SCAN_PIXELS) the CIS module 22 may have internal problems and needs to be replaced at the factory.

FIGS. 2–4 illustrate the averaging window to the left of the current pixel. In the actual implementation of the dust calibration algorithm the averaging is performed twice. The first time, the pixels are scanned left to right and the averaging window and dead zone are located to the left of the current pixel or "pre-pixel." The second time, the pixels are scanned right to left and the averaging window and dead zone are located to the right of the current pixel or post-pixel.

The locations for pixels identified as weak are stored on a list in the NVM 38. Preferably one NVM list is kept for locations of pixels that respond weakly during three hundred DPI scans. Another NVM list is kept for locations of pixels that respond weakly during six hundred DPI scans. Inherently weak pixels are only identified once during the manufacturer's end-of-line tests.

During the user environment calibration procedure the dust calibration algorithm finds white scan dust dips in the same way that it finds weak pixels during the factory calibration procedure (clean reference surface scan). The current pixel is compared to averaging windows and dead zones of width NAVG and NDEADZONE, respectively, as illustrated in FIG. 5. Dips which are not on the NVM weak pixel list are smoothed using the mean value from the average window. A white scan pixel is considered to be a dip if the sum of the average window values multiplied by the DIRTY_THRESH constant is greater than the current pixel value. This comparison is illustrated in FIG. 6. DIRTY_THRESH is greater than or equal to CLEAN_THRESH so the dust calibration algorithm never finds weak pixels with DIRTY_THRESH that were missed by CLEAN_THRESH.

If a dipped pixel is on the NVM weak pixel list, it is left alone because the dust calibration algorithm expects to find a low signal in that location. If a dipped pixel is not on the NVM list, then the algorithm assumes that the dip was created by dust or other artifact on the white reference surface 20. This dip will be smoothed by replacing its value with the average value from the pixels in the averaging window, as illustrated in FIG. 7. The window and dead zone are advanced when advancing the current pixel, unless a dip is found.

There is a potential for dust and other debris to cover more than one pixel or there may be several consecutive weak pixels. If a dip is found, the average window is not advanced. Instead, the average window remains stationary and the dead zone expands to include pixels until the end of the dip is found, as illustrated in FIG. 8. Once the end of the dip is found, the next pixel examined will be the current pixel of interest plus NAVG+NDEADZONE+1. If the width of the dip reaches MAX_DIP_WIDTH, then the dust calibration algorithm acts as though the current pixel is the last pixel in the dip. The average window and dead zone are reset for the next pixel as though the dip just ended. If the number of dipped pixels exceeds MAX_DIPS, the dust calibration algorithm will fail. This should not happen in practice because MAX_DIPS is greater than the total number of pixels. The averaging process takes place twice when smoothing white scan dust dips. The first time the pixels are scanned left to right and the averaging window and dead zone are located to the left of the current pixel or pre-pixel. The second time, the pixels are scanned right to left and the averaging window and dead zone are located to the right of the current pixel or post-pixel.

Figure 9:
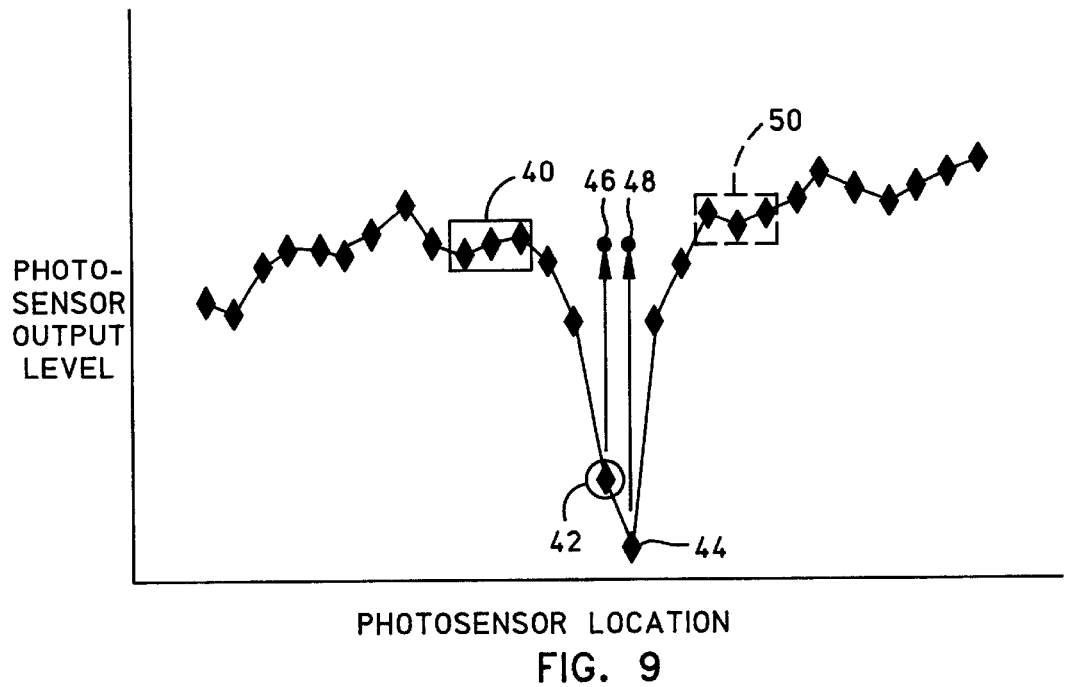
FIG. 9 is a graph further illustrating the handling of photosensor values in accordance with the firmware implemented dust calibration algorithm executed by the scroll fed optical scanner of FIG. 1.

FIG. 9 is a graph further illustrating the handling of photosensor values in accordance with the firmware implemented algorithm executed by the scroll fed optical scanner of FIG. 1. The microprocessor 26 runs the dust calibration algorithm for k=1 to the maximum pixel value (forward direction) and then runs the algorithm for k=maximum pixel value to 1 (backward direction). This process is repeated for the red, green and blue channels. The microprocessor 24 calculates N-pixel average (Xbar) where N=3 in this example using the output values 40 of three adjacent photosensors. The microprocessor 26 then compares Xbar to Pixel k labeled 42 in FIG. 9. Note that in this example there is an offset of Z pixels between the Xbar calculation location and Pixel k. In this example Z=2. If, for pixels 42 and 44 in the dip (Xbar Pixel k)>(dirty threshold), then their values are replaced as 46 and 48 with the value for Xbar only if the locations of the pixels in the dip were not stored in the NVM 38. The N-pixel location is then re-set to 50 and the process continues. There is an offset of Z pixels between the last pixel corrected and the next Xbar calculation location.

While we have described a preferred embodiment of our scroll fed optical scanner, and a preferred embodiment of optically scanning documents to eliminate streaks in the image data, modifications and adaptations will occur to those skilled in the art. Therefore, the protection afforded our invention should only be limited in accordance with the following claims.

We claim:

1. A scroll fed optical scanner, comprising:
   scroll fed transport means for propelling a document to be scanned along a paper path including an optical reference surface;
   light means for illuminating the optical reference surface, or if a document is being propelled along the paper path over the optical reference surface, a scan region on the document;
   a plurality of photosensors for receiving light reflected from the optical reference surface or the scan region on the document;
   circuit means connected to the photosensors for generating image data representative of information printed or otherwise formed on the document including calibration means for adjusting the gains applied to the outputs of selected ones of the photosensors to eliminate streaks in the image data otherwise due to the selected photosensors imaging debris on the optical reference surface; and
   wherein the circuit means includes a memory for storing a plurality of first locations of predetermined photosensors having output values below a first predetermined threshold value as determined during a factory calibration procedure performed against a clean optical reference surface, and the calibration means performs a dust calibration algorithm by adjusting the gains applied to the outputs of a plurality of photosensors in second locations having output values below a second predetermined threshold value due to imaging debris on the optical reference surface as determined during a subsequent user environment calibration, the second locations being different than the first locations.

2. The optical scanner of claim 1 wherein the first predetermined threshold value is less than the second predetermined threshold value.

3. The optical scanner of claim 1 wherein during performance of the dust calibration algorithm the gains applied to the outputs of the photosensors in the second locations are adjusted to raise their outputs to an average of the output values of a plurality of photosensors adjacent to the photosensors in the second locations.

4. The optical scanner of claim 1 wherein after the dust calibration algorithm is performed, the circuit means additionally performs a PRNU compensation and adjusts the gains applied to each of the outputs of the photosensors so that all of their output values have a substantially uniform value.

5. The optical scanner of claim 1 wherein the photosensors are contact image sensors.

6. The optical scanner of claim 5 wherein the contact image sensors and light means are mounted in a module that also includes lens means for focusing light reflected from a scan line on the document located within the scan region onto the photosensors.

7. The optical scanner of claim 1 wherein the photosensors are charge coupled devices.

8. The optical scanner of claim 1 wherein the optical reference surface is white in color.

9. A method of ensuring optimum scan output quality of a scanner, comprising the steps of:
performing an initial calibration scan of an optical reference surface with a plurality of photosensors when the optical reference surface is known to be clean;
storing the locations of all photosensors having output values below a first predetermined threshold value;
prior to a scan of a document, performing a subsequent calibration scan of the optical reference surface; and
performing a dust calibration algorithm by adjusting a gain applied to each photosensor output having an output value below a second predetermined threshold value as determined during the subsequent calibration scan only if its location was not one of the locations stored during the initial calibration scan, the amount of gain adjustment being sufficient such that the scan output is devoid of visible streaks otherwise due to the photosensors imaging debris or other artifacts present on the optical reference surface during the subsequent calibration scan.

10. The method of claim 9 wherein during the performance of the dust calibration algorithm the gain is adjusted to bring a resulting raised output value to a level that is an average of the output values of a plurality of surrounding photosensors.

11. The method of claim 9 wherein the first predetermined threshold value is below the second predetermined threshold value.

12. The method of claim 9 and further comprising the step of performing a PRNU compensation after the performance of the dust calibration algorithm and adjusting the gains applied to each of the outputs of the photosensors so that all of their output values have a substantially uniform value.

13. The method of claim 9 wherein the reference surface is white in color.

14. The method of claim 9 wherein the reference surface is sequentially illuminated with red, green and blue light sources during a scan of a document after the second calibration and gain adjustment.

15. The method of claim 9 wherein the calibrating and adjusting steps are performed in a scroll fed scanner.

16. The method of claim 9 and further comprising the step of determining during the performance of the dust calibration algorithm whether the number of photosensors with output values below the second predetermined threshold value exceeds a predetermined maximum allowed number.

17. The method of claim 16 wherein if the number of photosensors with output values below the second predetermined threshold value exceeds the predetermined maximum allowed number, only adjusting the gains applied to the outputs of all of the photosensors during a PRNU compensation so that their output values are substantially uniform.

18. A scroll fed optical scanner, comprising:
a scroll fed transport that propels a document to be scanned along a paper path, the paper path including an optical reference surface;
a light source mounted in the transport to illuminate the optical reference surface, or if a document is being propelled along the paper path over the optical reference surface, a scan region on the document;
a plurality of photosensors mounted in the transport to receive light reflected from the optical reference surface or the scan region on the document; and
a processing circuit connected to the photosensors that adjusts the gains applied to the outputs of selected ones of the photosensors to eliminate streaks in the image data otherwise due to the selected photosensors imaging debris on the optical reference surface, including a memory for storing a plurality of first locations of predetermined photosensors having output values below a first predetermined threshold value as determined during a factory calibration procedure performed against a clean optical reference surface, and the calibration circuit adjusts the gains applied to the outputs of a plurality of photosensors in second locations having output values below a second predetermined threshold value due to imaging debris on the optical reference surface as determined during a subsequent user environment calibration, the second locations being different than the first locations, and the calibration circuit additionally performs a PRNU compensation and further adjusts the gains applied to each of the outputs of the photosensors so that all of their output values have a substantially uniform value.

* * * * *